United States Patent [19]

Clift et al.

[11] Patent Number: 4,815,482
[45] Date of Patent: Mar. 28, 1989

[54] TREATMENT OF PARTICULATE MATERIALS

[75] Inventors: Roland Clift, Godalming; Roger W. Hedge, Lymington; Robert Legros, Guildford; Clive A. Millington, Godalming, all of United Kingdom

[73] Assignee: British-American Tobacco Company Limited, London, United Kingdom

[21] Appl. No.: 938,023

[22] Filed: Dec. 4, 1986

[30] Foreign Application Priority Data

Dec. 5, 1985 [GB] United Kingdom ................. 8530020

[51] Int. Cl.[4] .......................... A24B 3/10; A24B 3/12
[52] U.S. Cl. .................................... 131/300; 131/108; 131/296
[58] Field of Search ............... 131/302, 303, 304, 108, 131/296, 300

Primary Examiner—V. Millin

Attorney, Agent, or Firm—Kane, Dalsimer, Sullivan, Kurucz, Levy, Eisele and Richard

[57] ABSTRACT

Mobilization apparatus for the treatment, drying for example, of particulate material comprises a mobilization zone bounded by upwardly divergent walls. Particulate material in the zone is mobilized by being subjected to a flow of gaseous mobilizing medium supplied at a multiplicity of sites of the divergent walls. The material is simultaneously subjected to a flow of gaseous accelerating medium supplied in an upward direction from a lower region of the mobilization zone. The obtains in the mobilization zone of circulatory pattern comprising downward flow at the divergent walls and upward flow from a lower region of the zone.

In order to discharge the particulate material from the apparatus, a mask extending outwardly from the lower end of an upwardly extending discharge duct is brought to the upper end of the mobilization zone. The result is that the circulatory pattern is destroyed and the material is pneumatically transported up the discharge duct.

6 Claims, 3 Drawing Sheets

TREATMENT OF PARTICULATE MATERIALS

This invention relates to the treatment of particulate materials. The invention is particularly relevant to the treatment of fibrous particulate materials such as, for example, cut lamina tobacco.

As used herein the term "fibrous particulate material" means particulate material a substantial proportion at least of which comprises individual particles of which one length dimension is large by comparison with the other two length dimensions. Because of the presence of such elongate particles, within a body of fibrous particulate material there is a propensity for entanglement.

As used herein the term "mobilisation" means a controlled process in which in a body of particulate material individual particles are maintained in a separated condition so that the particles are free to move relatively to each other. With reference to fibrous particulate material, mobilisation further means that the material is wholly or substantially disentangled and maintained in a disentangled, particle separated condition.

As used herein the term "mobilising apparatus" means apparatus comprising wall means bounding a mobilisation zone, said wall means being upwardly divergent from the vertical, whereby the horizontal cross-sectional area of the mobilisation zone increases in an upward direction thereof, first, mobilisation nozzle means operable to supply gaseous mobilising medium at a multiplicity of sites of the wall means and second, acceleration nozzle means operable to supply gaseous accelerating medium in an upward direction from a location at a lower region of the mobilisation zone.

The horizontal cross-section of the mobilisation zone can be of various shapes, including square, rectangular, circular, elliptical and polygonal. The shape may be constant or may vary from one height location of the mobilisation zone to another. The wall means may in vertical cross-section be straight; alternatively the wall means may be curved, in concave or convex fashion, over a part or the whole of the upward extent thereof. If the horizontal cross-section of the mobilisation zone is of square shape, or of other shape having oppositely situated and parallel wall members of the wall means, such wall members are preferably symmetrically configured with reference to a central vertical plane or axis. The angle of upward divergence of such wall members is suitably in the region of 30 degrees if the apparatus is to be used for the treatment of cut lamina tobaccos.

At the bottom of the mobilisation zone the horizontal cross-section thereof should preferably be small in comparison with the horizontal cross-section at the top of the zone.

Suitably, the mobilisation nozzle means takes the form of an array of perforations in the wall means. The perforated wall means may bound plenum changer means with which the perforations directly communicate.

As used herein the term "a method of treating parrticulate material", means a method wherein particulate material, fibrous particulate material for example, is maintained in a mobilised state in a mobilisation zone bounded by wall means upwardly divergent from the vertical, whereby the horizontal cross-sectional area of the mobilisation zone increases in an upward direction thereof, gaseous mobilising medium being supplied at a multiplicity of sites of the wall means to the mobilisation zone whereby there obtains in said zone a circulatory pattern comprising downward flow at the wall means and upward flow from a lower region of the zone.

Advantageously, gaseous accelerating medium is supplied to the mobilisation zone in an upward direction from a location at a lower region of the zone.

The treatments of particulate materials which may be practised using the method or mobilisation apparatus of the type defined include drying, moistening, heating, cooling, blending, mixing, expanding or applying a flavourant or other additive. The treatments may also include chemical treatments.

Air is a practicable mobilising medium and a practicable accelerating medium. Steam or other vapour or gas may be injected into the mobilised bed of particulate material, either directly or with the mobilising medium and/or accelerating medium. Steam or other vapour or gas may be employed as mobilising and/or accelerating medium.

When the method of treating particulate material is carried out utilising an accelerating flow as well as a mobilising flow, the mobilising flow serves to mobilise the fibrous or other particulate material and the accelerating flow serves to enhance the circulation, and thereby the mixing, of the mobilised body of particulate material. It has been found that when the only gaseous flow employed is an upward flow, fibrous particulate materials remain or become entangled and so are not mobilised in the sense above defined. For any one particulate material or mobilising apparatus constructed in accordance with the present invention there will be a finite range of mobilising and accelerating flow rates within which controlled operation is possible. These ranges may be readily ascertained by simple experiment.

The present invention provides mobilising apparatus comprising discharging means, said discharging means comprising discharge duct means and further comprising mask means movable between an obturating position and a non-obturating position, said mask means when in said obturating position providing a gas-flow barrier extending outwardly of said duct means at the upper end of the mobilisation zone.

Preferably, the discharge duct means comprises a first, fixed duct and a second duct arranged for telescopic sliding movement with the first duct, the mask means being fixed to and extending from a lower end of the second duct.

When the mask means is in the obturating position thereof the mask means advantageously contacts walls of the mobilising apparatus.

The mask means may be of flat configuration. Alternatively the mask means may in section be of a curved, or partly curved configuration.

The present invention also provides a method of treating particulate material, wherein gaseous accelerating medium is supplied to the mobilisation zone in an upward direction from a location at a lower region of said zone and mask means is moved to an upper location of the mobilisation zone, at which location the mask means extends outwardly from a lower, open end of upwardly extending duct means, whereby the particulate material is pneumatically transported upwardly through the duct means.

In order that the present invention may be clearly understood and readily carried into effect, reference will now be made, by way of example, to the accompanying drawings, in which.

Figure 1:
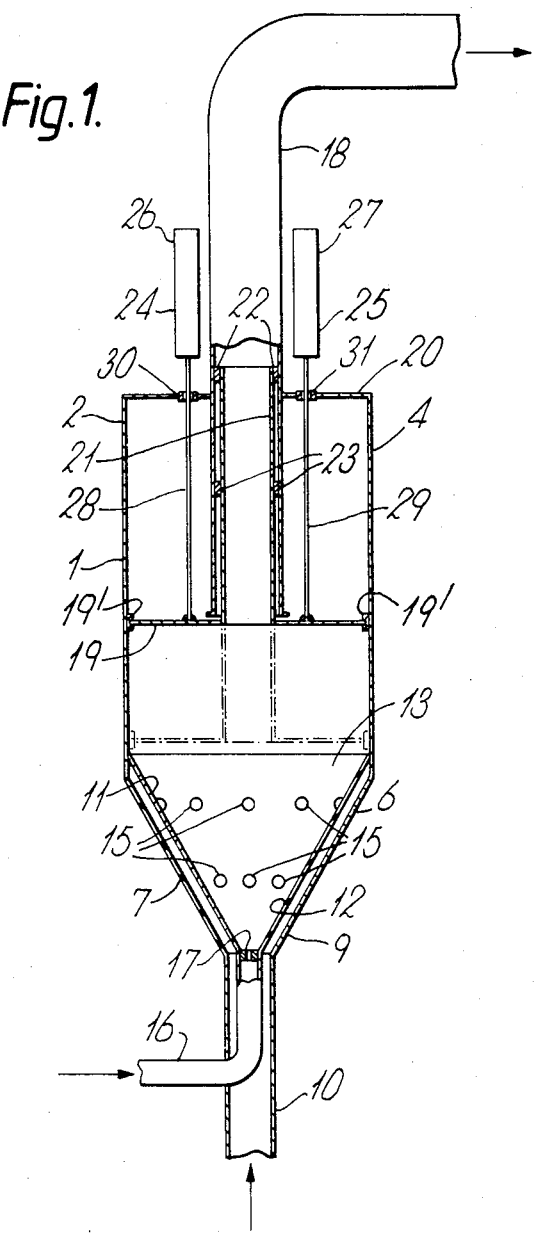
FIG. 1 shows, diagrammatically and in vertical section, mobilisation apparatus.
Figure 2:
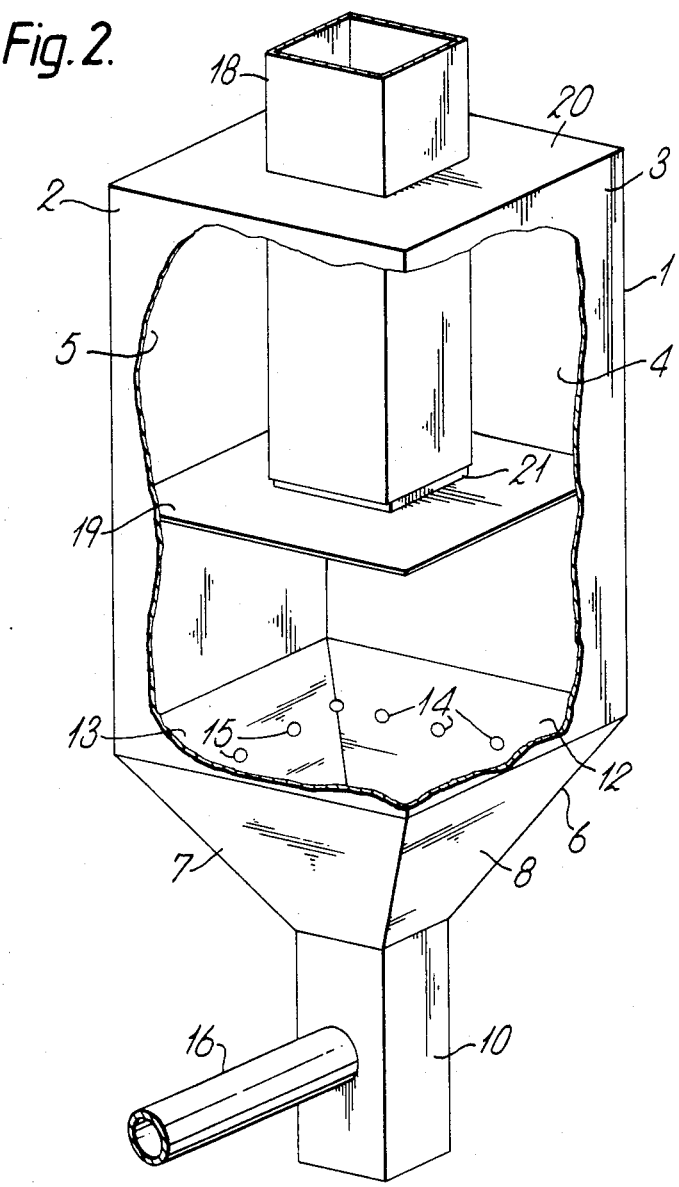
FIG. 2 shows diagrammatically a perspective view of major parts of the apparatus of FIG. 1.
Figure 4:
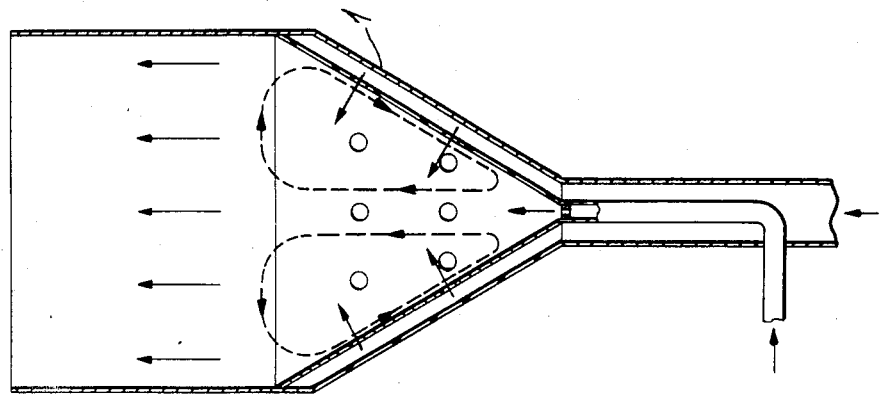
Figure 3:
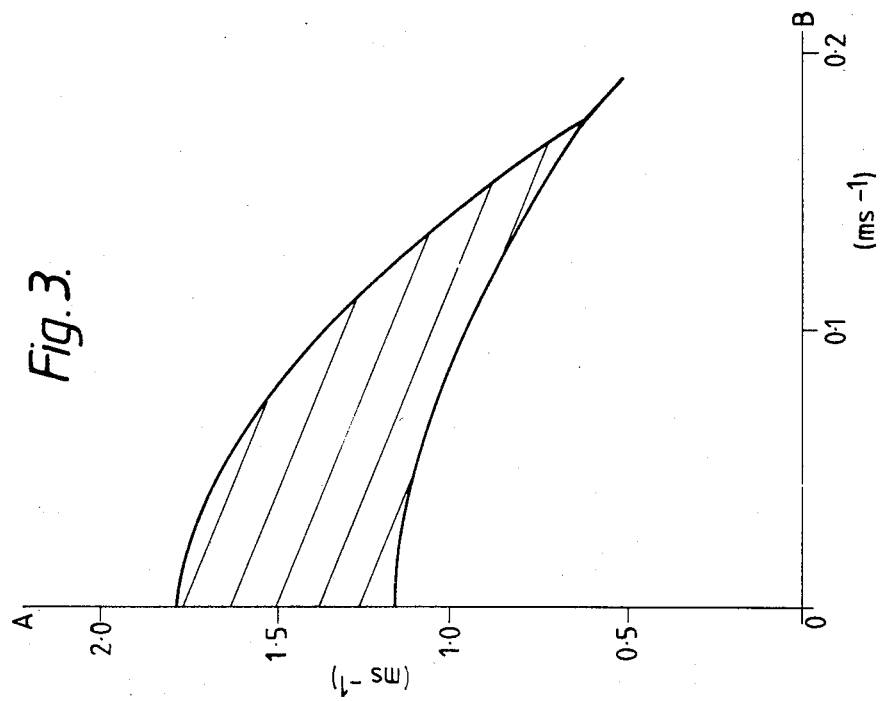

FIG. 3 is a graph indicating the ranges of mobilising gas velocity (axis A) and accelerating gas velocity (axis B) for which controlled operation is possible when the apparatus of FIGS. 1 and 2 is used for drying a cut lamina tobacco; and FIG. 4 shows a view similar to that of lower portions of FIG. 1 but also including an indication of a circulatory pattern in a mobilisation zone of the apparatus.

The mobilisation apparatus of FIGS. 1 and 2 comprises an upwardly extending casing 1 of square horizontal section, the side walls of the casing 1 being designated by reference numerals 2-5. In FIG. 2 parts of walls 2 and 3 have been removed. A lower part 6 of the casing 1 comprises upwardly diverent walls, three of which walls are designated by reference numerals 7, 8 and 9 in FIGS. 1 and 2. Trunking 10 extends downwardly from the lower end of the part 6 of the casing 1.

Disposed inwardly of and extending parallel to each of the walls of the part 6 of the casing 1 is a diffuser plate, those of these plates observable in FIGS. 1 and 2 being designated by reference numerals 11, 12 and 13. Along the upper edge thereof each of these four diffuser plates contacts, in gas-tight fashion, a respective one of the side walls 2-5 of the casing 1. Each of the diffuser plates comprises an array of perforations, the perforations in plate 12 being designated 14 and those of plate 13 being designated 15. The diffuser plates bound a mobilisation zone.

A pipe 16 extends through the wall of the trunking 10 and, as is indicated in FIG. 1, joins at its upper end the lower convergent ends of the diffuser plates. Fitted across the pipe 16 at its upper end is an orifice plate 17.

Discharging means of the mobilisation apparatus comprises a trunking 18, providing a first part of discharge duct means, and a movable, gas impervious flange member 19 providing mask means.

The trunking 18, which is fixed relative to the casing 1, extends from a location within the casing 1, which location is vertically spaced above the lower part 6 of the casing 1, through an upper end wall 20 of the casing 1.

The flange member 19 is attached to and extends horizontally from the periphery of a length of inner trunking 21, providing a second part of the discharge duct means, at a lower end of the trunking 21, to the four side walls 2-5 of the casing 1. The outer side edges of the member 19 are provided with gas-tight seal means designated 19'. As depicted in FIG. 1, the member 10 is at an upper position thereof and the trunking 21 is disposed wholly within the trunking 18, from which it is held in spaced relationship by spacing means 22 and 23 attached to the trunking 21.

The discharging means further comprises actuation means operable to move the flange means 19, together with the inner trunking 21, between the upper position thereof and a lower position thereof, which lower position, shown in broken line in FIG. 1, is close above the lower part 6 of the casing 1. The actuation means, which for the sake of simplicity is not shown in FIG. 2, may comprise, for example, two pneumatic cylinder and piston or other linear actuation units 24 and 25. Cylinders 26 and 27 of the units 24, 25 are disposed, in vertical orientation, at locations above and fixed relatively of the casing 1. Extended rods pass downwardly through glands 30 and 31, located in the top wall 20 of the casing 1, into attachment with the flange member 19.

In use of the mobilisation apparatus for the purpose of, for example, drying moist cut lamina tobacco, a quantity of the tobacco is disposed within the space jointly defined by the four diffuser plates. Suitably, the tobacco is introduced into the casing 1 via the trunking 18 and 21 from tobacco charging means (not shown).

With the flange member 19 in the upper position thereof, warm mobilising air is supplied under low pressure to the trunking 10, from which it passes to the spaces between the walls of part 6 of the casing 1 and the associated diffuser plates and from there through the diffuser plate perforations into contact with the tobacco. Concurrently, warm accelerating air is supplied under low pressure to the pipe 16, from which it issues in a vertically upward direction into the tobacco charge. When starting up the process, it is preferable for the mobilising flow to be established before initiation of the accelerating flow.

As a result of the geometry of the mobilisation zone and of the provision of mobilising air and accelerating air there is obtained a controlled mobilisation of the cut tobacco. Such mobilisation results in a disentanglement of the elongate fibres and the attainment of a close approach to a perfect mixing condition.

The hatched area shown in FIG. 3 represents the zone of controlled operation of the mobilisation apparatus in terms of the superficial velocity of the mobilising air (ordinate A) and the superficial velocity of the accelerating air (abscissa B).

In FIG. 4 there is indicated the circulatory pattern of air and entrained tobacco particles which obtains in the mobilised bed. It may be observed that there are downward flows at the sloping walls defining the mobilisation zone and an upward flow centrally of the zone. The circulatory pattern further comprises outward flows from the central zone. The mobilised bed is located substantially wholly within the space defined by the divergent walls, i.e. diffuser plates, although, as shown, the bed does extent to a location above the upper ends of the diffuser plates.

The basic circulatory pattern just referred to is established by the mobilising flow, but is enhanced by the presence of the accelerating flow.

The circulatory flow is, of course, superimposed upon a general upward flow of air within the apparatus.

When it is desired to discharge the tobacco from the mobilisation apparatus the flange member 19 is moved to the lower position thereof under action of the cylinder and piston units 24, 25. When the member 19 occupies its lower position the member 19 obturates the space between lower end of the trunking 21 and the side walls 2-5 of the casing 1 at a vertical location of the casing 1 such that the above mentioned circulatory pattern is destroyed. As a result the upward air flow in the central zone is so significantly increased that the tobacco becomes subject to pneumatic transport upwardly through the trunking 18 and 21. The trunking 18 may at its end remote the casing 1 be connected to an air/tobacco separator (not shown).

Whereas as shown in FIGS. 1 and 2 the walls 2-5 of the casing 1 extending vertically, it could be arranged for these walls to be gently downwardly convergent such that the outer edges of the flange member 19 contact the walls only when the flange member has been lowered to its lower, cirulatory-pattern destroying position.

What is claimed is:

1. Mobilising apparatus comprising a mobilisation zone and discharging means, said discharging means comprising upwardly extending discharge duct means and further comprising mask means movable between an obturating position and a non-obturating position, said mask means when in said obturating position providing a gas-flow barrier extending outwardly of said duct means at the upper end of the mobilisation zone.

2. Apparatus as claimed in claim 1, wherein said duct means comprises a first, fixed duct and a second duct telescopically slidable relative to said first duct.

3. Apparatus as claimed in claim 1 or 2, wherein said mask means is secured to said duct means.

4. Apparatus as claimed in claim 1, wherein when said mask means is in said obturating position, the outer edges of said mask means are in contact with wall means of said apparatus.

5. Apparatus as claimed in claim 1, in which said discharging means further comprises actuation means operable to move said flange means between the obturating and non-obturating positions thereof.

6. A method of treating particulate material in a mobilisation zone, wherein gaseous accelerating medium is supplied to the mobilisation zone in an upward direction from a location at a lower region of said zone and mask means is moved to an upper location of the mobilisation zone, at which upper location the mask means extends outwardly from a lower, open end of upwardly extending duct means, whereby the particulate material is pneumatically transported upwardly through the duct means.

* * * * *